(No Model.)

J. E. BLACKMORE.
FENCE WIRE CARRIER AND STRETCHER.

No. 333,277. Patented Dec. 29, 1885.

Witnesses:
Orra C. Moore.
L. S. Smith

Inventor:
John E. Blackmore,
By Thomas G. Orwig, Atty.

UNITED STATES PATENT OFFICE.

JOHN E. BLACKMORE, OF WALNUT, IOWA, ASSIGNOR OF ONE-HALF TO O. M. BRUCE, OF SAME PLACE.

FENCE-WIRE CARRIER AND STRETCHER.

SPECIFICATION forming part of Letters Patent No. 333,277, dated December 29, 1885.

Application filed April 20, 1885. Serial No. 162,865. (No model.)

*To all whom it may concern:*

Be it known that I, JOHN E. BLACKMORE, of Walnut, in the county of Pottawattamie and State of Iowa, have invented a Fence-Wire Carrier and Stretcher, of which the following is a specification.

My object is to save time and labor in making barbed-wire fences; and my invention consists in the construction and combination of a frame, a spool-holder, a reversible drum, and a wire-holding device, as hereinafter fully set forth, in such a manner that my complete machine can be readily attached to a common farm-wagon, a spool of wire placed upon the spool-holder, and sections of the wire unwound from the spool and laid down alongside of a row of fence-posts as the wagon is advanced, and then stretched and held by means of the drum and wire-holder when the wagon is stationary until the stretched section is fastened to the posts by means of staples, or in any suitable way.

Figure 1:
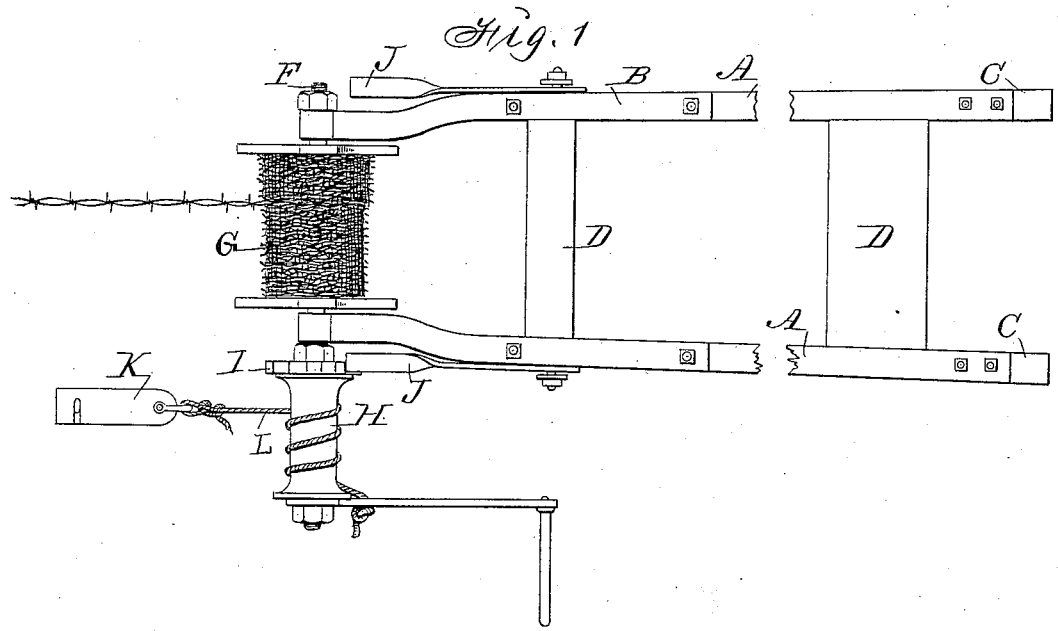
Figure 2:
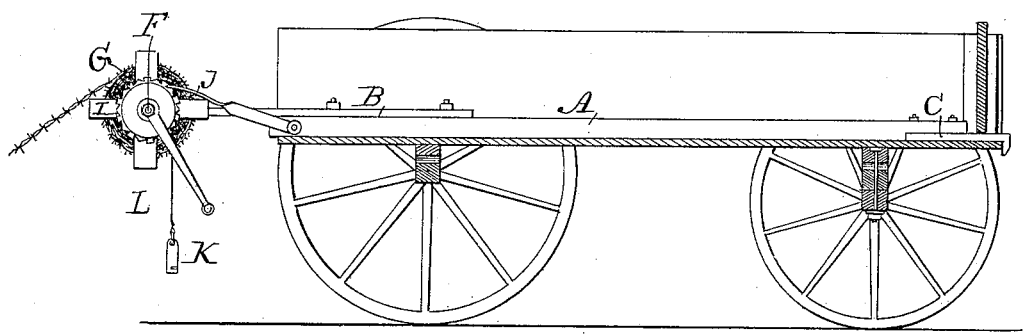

Figure 1 of my accompanying drawings is a top view of my machine. Fig. 2 is a side view showing it attached to a wagon as required for practical use. Together, these figures clearly illustrate the construction, application, and operation of my complete invention.

A A are the wooden side pieces of an oblong frame.

B B are metal bars and shaft-bearers fixed on top of the rear ends of the pieces A by means of screw-bolts.

C C are metal hooks, fixed on the under sides and front ends of the pieces A, to engage the front end of a wagon-box, as shown in Fig. 2.

D D are cross-pieces that connect the side pieces, A, and are fastened thereto by means of mortises and tenons, or in any suitable way.

F is a straight shaft extended through the free ends of the bearers B. It is secured by means of nuts on its screw-threaded ends.

G represents a spool of fence-wire placed loosely upon the shaft and between the bearers B.

H is a drum slipped on and fastened to the projecting end of the shaft and outside of the bearers B.

I represents a duplex ratchet-wheel formed on or fixed to the inner end of the drum H. The teeth in the periphery of the wheel I are formed in such a manner that they will engage pawls J on opposite sides. A crank-handle is fixed to the opposite end of the drum.

K represents a wire-holding device, connected with the drum H by means of a rope, L.

In the practical operation of my invention, I place the frame A B flat upon the bottom of a wagon-box in such a manner that the hooks C will project downward over the front of the bottom, and allow the front end-board to rest upon the frame. The bearers B will then project in rear of the box to support a spool of wire, as shown in Fig. 2. When thus prepared, I fasten the end of the wire on the spool to a post, and drive along the line of posts to which the wire is to be fixed any distance desired, and then stop and attach the wire-holder K to the fence-wire, and by means of the handle on the end of the drum H wind the rope upon the drum, and thereby draw and stretch the fence-wire along the line of posts. The pawl J, fixed to the frame, engages the wheel I and prevents any backlash of the stretched wire when the hand-power applied to the crank is relaxed, and retains it taut until it is fixed to the posts by means of fence-staples, or in any suitable way. The wagon is then farther advanced, and another section of the wire on the spool unwound and stretched and fastened in the same way. Section after section can be thus taken from the spool and stretched and fastened to a line of posts until the end of the line of posts is reached. By simply turning the wagon about and changing the drum from the one end of the shaft to the other end and opposite side of the frame and spool-carrier a return-trip can be made to stretch a second fence-wire parallel with the first along the same line of posts. By thus carrying a spool of wire and stretcher and jointly operating the wagon and stretcher in making a wire fence the work will be greatly facilitated, and more fence can be completed in a given time than when a machine must be fastened to a post every time a section of wire is to be stretched and fastened.

I claim as my invention—

The fence-wire carrier and stretcher composed of an oblong frame having shaft-bearers B at one end and hooks C at the opposite end, a detachable shaft, F, a reversible drum, H, having a duplex ratchet-wheel, I, fixed pawls J, and a wire-holding device, K, and rope or chain L, substantially as shown and described, to operate in the manner set forth.

JOHN E. BLACKMORE.

Witnesses:
JNO. P. BURKE,
O. M. BRUCE.